United States Patent
Bender et al.

(10) Patent No.: US 11,315,544 B2
(45) Date of Patent: Apr. 26, 2022

(54) COGNITIVE MODIFICATION OF VERBAL COMMUNICATIONS FROM AN INTERACTIVE COMPUTING DEVICE

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Craig M. Trim, Ventura, CA (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 16/451,611

(22) Filed: Jun. 25, 2019

(65) Prior Publication Data

US 2020/0410978 A1    Dec. 31, 2020

(51) Int. Cl.
*G10L 13/033*    (2013.01)
*G10L 13/047*    (2013.01)
*G06N 20/00*    (2019.01)
*G10L 13/00*    (2006.01)

(52) U.S. Cl.
CPC .......... *G10L 13/0335* (2013.01); *G06N 20/00* (2019.01); *G10L 13/00* (2013.01); *G10L 13/047* (2013.01); *G10L 13/033* (2013.01)

(58) Field of Classification Search
CPC ............ G10L 2015/228; G10L 13/033; H04M 3/5166; H03G 3/32
See application file for complete search history.

(56) References Cited

U.S. PATENT DOCUMENTS

| | | | |
|---|---|---|---|
| 8,510,399 B1 | 8/2013 | Byttow et al. | |
| 10,003,561 B2 | 6/2018 | Duze et al. | |
| 2004/0193422 A1* | 9/2004 | Fado | G10L 13/033 704/260 |
| 2007/0071206 A1* | 3/2007 | Gainsboro | H04M 3/568 379/168 |

(Continued)

FOREIGN PATENT DOCUMENTS

| | | |
|---|---|---|
| CN | 107146613 | 9/2017 |
| CN | 107277207 | 10/2017 |

(Continued)

OTHER PUBLICATIONS

Dey et al., "Understanding and Using Context", Personal and Ubiquitous Computing, vol. 5, Issue 1, Feb. 2001, 9 pages.

(Continued)

*Primary Examiner* — Feng-Tzer Tzeng
(74) *Attorney, Agent, or Firm* — Brian Restauro; Andrew D. Wright; Roberts Calderon Safran & Cole, P.C.

(57) ABSTRACT

A method includes: determining, by a computer device, a current context associated with a user that is the target audience of an unprompted verbal output of an interactive computing device; determining, by the computer device, one or more parameters that are most effective in getting the attention of the user for the determined current context; and modifying, by the computer device, the unprompted verbal output of the interactive computing device using the determined one or more parameters.

25 Claims, 4 Drawing Sheets

(56) References Cited

U.S. PATENT DOCUMENTS

| | | | | |
|---|---|---|---|---|
| 2008/0319751 | A1* | 12/2008 | Kennewick | G10L 15/1822 704/E15.04 |
| 2009/0245533 | A1* | 10/2009 | Gerlach | H04M 1/6083 381/86 |
| 2014/0270108 | A1* | 9/2014 | Riahi | G06N 20/00 379/88.01 |
| 2016/0020744 | A1* | 1/2016 | Kok | H03G 3/32 381/57 |
| 2016/0110071 | A1 | 4/2016 | Brown et al. | |
| 2016/0267764 | A1 | 9/2016 | Park et al. | |
| 2017/0076000 | A1 | 3/2017 | Ashoori et al. | |
| 2018/0031405 | A1 | 2/2018 | Berentsen et al. | |

FOREIGN PATENT DOCUMENTS

| | | |
|---|---|---|
| CN | 107484034 | 12/2017 |
| EP | 3499501 | 6/2019 |
| JP | 2002350167 | 12/2002 |

OTHER PUBLICATIONS

Issa, et al., "Usability and Human Computer Interaction (HCI)", Sustainable Design, 2015, 19 pages.

Anonymous, "A Method and System for Detecting Cognitive Change of an Individual by Monitoring Communication Patterns", ip.com, IP.com No. IPCOM000242934D, Sep. 1, 2015, 5 pages.

Anonymous, "Automated property alignment of communication channel based on the relationships and interactive experience", ip.com, IP.com No. IPCOM000257332D, Feb. 1, 2019, 5 pages.

Anonymous, "Method and System for Providing Dynamic adaptation of Situation-aware Expressions in Cognitive Avatar Systems", ip.com, IP.com No. IPCOM000255351D, Sep. 19, 2018, 4 pages.

Anonymous, "Method and System for Cognitively Developing Social Interaction Skills of a User by Correlating Contextual Data of User Emotions", ip.com, IP.com No. IPCOM000253918D, May 15, 2018, 3 pages.

Liu, "Make Alexa your own: How to change the digital assistant's voice", Digital Trends, Accessed Jun. 24, 2019, 19 pages, <https://www.digitaltrends.com/home/how-to-change-alexas-voice/>.

Anonymous, "Test your Level of English Listening", Exam English, Accessed Jun. 24, 2019, 3 pages, <https://www.examenglish.com/leveltest/listening_level_test.htm>.

International Search Report and Written Opinion of the International Searching Authority dated Sep. 29, 2020 in PCT Application No. PCT/IB2020/055772, 9 pages.

\* cited by examiner

COGNITIVE MODIFICATION OF VERBAL COMMUNICATIONS FROM AN INTERACTIVE COMPUTING DEVICE

BACKGROUND

The present invention relates generally to interactive computing devices and, more particularly, to cognitive modification of verbal communications from an interactive computing device.

Interactive computing devices may include voice command devices, such as smart speakers, smartphones, robots, etc., that include an integrated virtual assistant, where the integrated virtual assistant is a software agent that is configured to perform tasks for an individual (e.g., a user) based on verbal commands from the user. In the case of smart speakers and smartphones, the task is most often a verbal (e.g., audio) output from the interactive computing device to the user. In the case of robots, the task may include a verbal output from the interactive computing device and additionally a physical task performed by the robot. In both cases, the verbal output may be prompted (e.g., immediately in response to a verbal command/question from the user) or unprompted (e.g., not immediately in response to a verbal command/question from the user).

Current interactive computing devices only allow for a minimal amount of personalization of the verbal output. In one example, a user may configure an interactive computing device to address the user by a particular name. In another example, a user may configure an interactive computing device to provide verbal output in one of plural predefined voice styles. However, once a particular one of the plural predefined voice styles is selected, the interactive computing device uses only the selected voice style, and does not produce any verbal output that varies from the selected voice style.

SUMMARY

In a first aspect of the invention, there is a computer-implemented method including: creating, by a server, a corpus of data based on plural verbal interactions involving a user; analyzing, by the server, the corpus of data to determine output parameters that increase an attentiveness of the user in different contexts; determining, by the server, a verbal output of an interactive computing device to the user; determining, by the server, a current context; modifying, by the server, the verbal output based on the determined output parameters and the current context; and causing, by the server, the interactive computing device to output the modified verbal output to the user. In embodiments, the corpus of data includes plural entries, wherein each entry includes: a context associated with a respective verbal output; a measure of effectiveness of the respective verbal output; and at least one parameter of the respective verbal output. In this manner, embodiments of the invention advantageously personalize the verbal output of an interactive computing device in a way that is determined from analyzing historic interactions to be most effective at getting the attention of the target audience.

In another aspect of the invention, there is a method comprising: creating, by an interactive computing device, a corpus of data based on plural verbal interactions involving a user; analyzing, by the interactive computing device, the corpus of data to determine output parameters that increase an attentiveness of the user in different contexts; determining, by the interactive computing device, a verbal output of the interactive computing device to the user; determining, by the interactive computing device, a current context; modifying, by the interactive computing device, the verbal output based on the determined output parameters and the current context; and outputting, by the interactive computing device, the modified verbal output to the user. In embodiments, the interactive computing device is a robot that performs at least one physical task. In this manner, embodiments of the invention advantageously personalize the verbal output of an interactive computing device in a way that is determined from analyzing historic interactions to be most effective at getting the attention of the target audience.

In another aspect of the invention, there is a computer program product including a computer readable storage medium having program instructions embodied therewith. The program instructions are executable by a computer device to cause the computer device to analyze a corpus of data of a user, wherein the analyzing comprises using machine learning to determine parameters that are most effective in getting the user's attention in different contexts; determine a current context of the user based on the user being a target audience of a verbal output of an interactive computing device; modify the verbal output based on the current context and the determined parameters; and cause the interactive computing device to output the modified verbal output to the user. In embodiments, the current context is selected from the group consisting of: an activity the user is performing; a biometric state of the user; and an amount of environmental noise; and the modifying the verbal output comprises changing at least one selected from the group consisting of: name or names used to address the user in the verbal output; volume of the verbal output; cadence of the verbal output; specific words used in the verbal output; categories of words used in the verbal output; pronunciation of words used in the verbal output; and language used in the verbal output. In this manner, embodiments of the invention advantageously personalize the verbal output of an interactive computing device in a way that is determined from analyzing historic interactions to be most effective at getting the attention of the target audience.

In another aspect of the invention, there is system including a processor, a computer readable memory, and a computer readable storage medium. The system includes: program instructions to determine a verbal output for an interactive computing device to present to a user; program instructions to determine a current context of the user; program instructions to modify the verbal output based on verbal output parameters determined to the most effective for the user for the current context; and program instructions to cause the interactive computing device to output the modified verbal output to the user. The program instructions are stored on the computer readable storage medium for execution by the processor via the computer readable memory. In embodiments, the current context is selected from the group consisting of: an activity the user is performing; a biometric state of the user; and an amount of environmental noise; and the modifying the verbal output comprises changing at least one selected from the group consisting of: name or names used to address the user in the verbal output; volume of the verbal output; cadence of the verbal output; specific words used in the verbal output; categories of words used in the verbal output; pronunciation of words used in the verbal output; and language used in the verbal output. In this manner, embodiments of the invention advantageously personalize the verbal output of an interactive computing device in a way that is determined from analyzing historic interactions to be most effective at getting the attention of the target audience.

In another aspect of the invention, there is a method comprising: determining, by a computer device, a current context associated with a user that is the target audience of an unprompted verbal output of an interactive computing device; determining, by the computer device, one or more parameters that are most effective in getting the attention of the user for the determined current context; and modifying, by the computer device, the unprompted verbal output of the interactive computing device using the determined one or more parameters. In some embodiments, the computer device comprises a server that communicates with the interactive computing device via a network, and further comprising the server transmitting data defining the modified unprompted verbal output to the interactive computing device for output to the user by the interactive computing device. In some embodiments, the interactive computing device is a robot that performs at least one physical task. In this manner, embodiments of the invention advantageously personalize the verbal output of an interactive computing device in a way that is determined from analyzing historic interactions to be most effective at getting the attention of the target audience.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to interactive computing devices and, more particularly, to cognitive modification of verbal communications from an interactive computing device. According to aspects of the invention there is a system and method to personalize a verbal output of an interactive computing device based on a determination of what is most likely to get a user's attention in the current context. In embodiments, the determination is made based on an analysis of historic interactions between the user and the interactive computing device (or between the user and another user). The analysis is performed to determine which parameters are most effective at getting a particular user's attention in a particular context. In embodiments, the parameters include at least one of: name(s) used to address the user in the verbal output; volume of the verbal output; cadence of the verbal output; specific words used in the verbal output; categories of words used in the verbal output; pronunciation used in the verbal output; and language used in the verbal output. In this manner, implementations of the invention modify at least one of these parameters of the verbal output of an interactive computing device to attempt to get the attention of a target user of the verbal output.

As described herein, interactive computing devices typically perform both prompted verbal outputs and unprompted verbal output. Unprompted verbal outputs involve the interactive computing device attempting to get the attention of a user that is the target audience of the output. The inventors have found that different users react differently and are more attentive to different types of verbal output in different contexts. As a result, different individuals respond differently depending on the volume, word selection, cadence, and pronunciation of a verbal output, and also depending on the context surrounding the verbal output. However, conventional interactive computing devices do not vary any facets of an unprompted verbal output depending on the user and/or the context. Instead, conventional interactive computing devices always use the same user-selected voice style for all verbal outputs.

Aspects of the invention address this shortcoming of conventional interactive computing devices by providing a system that modifies a verbal output of an interactive computing device based on parameters that are determined to get (e.g., increase) the attention of the target user. In embodiments, the system analyzes historic interactions between a user and an interactive computing device (and/or between the user and another user), and determines from these historic interactions what types of parameters are most effective in getting (e.g., increasing) the user's attention for a verbal output. The parameters may include, for example, at least one of: name or names used to address the user in the verbal output; volume of the verbal output; cadence of the verbal output; specific words used in the verbal output; categories of words used in the verbal output; pronunciation of words used in the verbal output; and language used in the verbal output.

In embodiments, the analysis takes into account contextual information associated with the historic interactions, such as ambient/extraneous noise level during the interaction, activity being performed by the user during the interaction, and biometric state of the user during the interaction. In particular embodiments, the system determines the current context associated with a user that is the target audience of an unprompted verbal output, determines the one or more parameters that are most effective in getting the attention of the user for the determined context, and modifies the verbal output of the interactive computing device using the determined one or more parameters. In this manner, implementations of the invention advantageously personalize the verbal output of the interactive computing device based on a determination of what is most likely to get the user's attention in the current context. As a result, implementations of the invention provide a technical solution to the technical problem of interactive computing devices that deliver verbal output in a non-personalized manner, where such non-personalized verbal output is less likely to get the attention of a user in a particular context.

Embodiments of the invention utilize IoT (Internet of Things) devices to capture information about an individual that will help them respond as desired. In embodiments, the interactive computing device is configured to modify its output volume based on the individual it is addressing and the current environmental noises, change the choice of names based on learned responses from others addressing the individual, change the pace of the conversation when addressing someone based on learned responses to how a person responds, or even respond in a different language. Embodiments of the invention are thus directed to modifying an interactive conversation between a person and an interactive computing device based on cognitive analysis of historical responses and current conditions.

Embodiments of the invention improve the technology of interactive computing devices by modifying verbal outputs of the interactive computing device based on the user and, more particularly, based on a determination of what is most likely to get the user's attention in the current situation. Embodiments of the invention employ an unconventional arrangement of steps including: creating a corpus of data based on plural verbal interactions involving a user; analyzing the corpus of data to determine output parameters that increase an attentiveness of the user in different contexts; determining a verbal output of an interactive computing device to the user; determining a current context; modifying the verbal output based on the determined output parameters and the current context; and causing the interactive computing device to output the modified output to the user. The steps themselves are unconventional, and the combination of the steps is also unconventional. For example, the step of analyzing the corpus of data to determine output parameters that increase an attentiveness of the user in different contexts creates new information that does not exist in the system, and this new data is then used in subsequent steps in an unconventional manner (e.g., in the step of modifying the verbal output based on the determined output parameters and the current context). Embodiments of the invention also utilize elements and/or techniques that are necessarily rooted in computer technology, including generating and modifying verbal outputs of interactive computing devices.

To the extent implementations of the invention collect, store, or employ personal information provided by, or obtained from, individuals (for example, data associated with user interactions with an interactive computing device, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
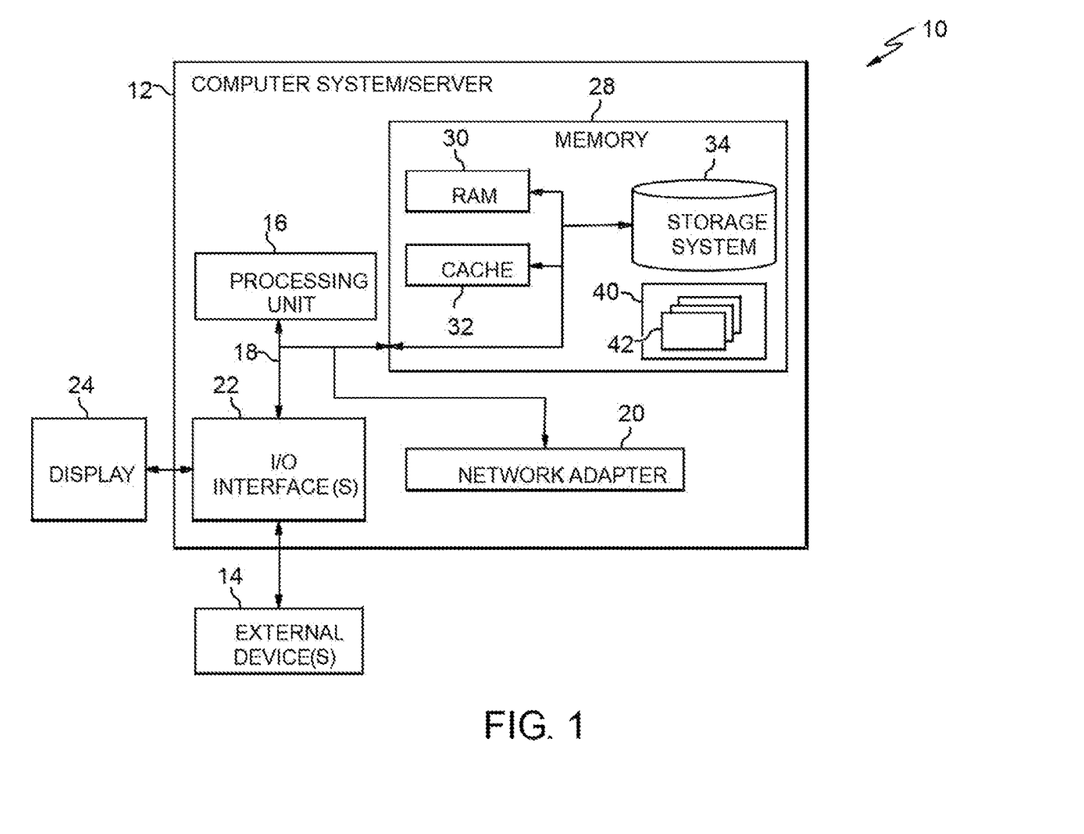
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2A:
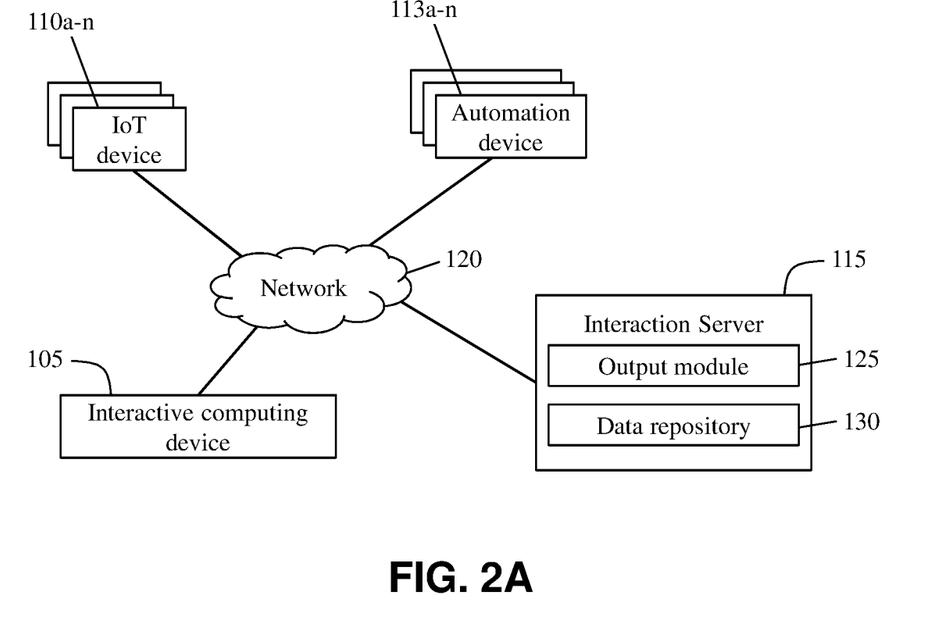
FIG. 2A shows a block diagram of an exemplary environment in accordance with aspects of the invention.

FIG. 2A shows a block diagram of an exemplary environment in accordance with aspects of the invention. In embodiments, the environment includes an interactive computing device 105, a plurality of Internet of Things (IoT) devices 110a-n, and interaction server 115 connected to a network 120. The network 120 comprises one or more communication networks such as one or more of a LAN, a WAN, and the Internet.

In implementations of embodiments of the invention, the interactive computing device 105 is one of a smart speaker, smartphone, and robot, and includes an integrated virtual assistant, where the integrated virtual assistant is a software agent that is configured to perform tasks for a user based on verbal commands from the user. In such implementations, the interactive computing device 105 is a computer device comprising one or more elements of the computer system 12 of FIG. 1 including at least a microphone, a speaker, and a processor.

In some embodiments, the interactive computing device 105 is a component in a smart home or smart facility in which the interactive computing device 105 is wirelessly connected to a network of home automation devices 113a-n, computers, etc. The interactive computing device 105 device may respond to verbal commands (e.g., "turn on the kitchen lights") by mapping the verbal command to an electronic command, and sending the corresponding command to a one of the devices 113a-n capable of executing the command. Examples of such devices 113a-n include but are not limited to: smart thermostats; smart lights; smart electrical outlets; smart music players; smart televisions; smart cameras; smart stoves/ovens; smart refrigerators; smart doorbells; and smart exercise equipment.

Additionally, or alternatively, the interactive computing device 105 provides verbal responses to verbal questions presented by a human user. In these implementations, the interactive computing device 105 receives the verbal question from the user via a microphone, converts the received audio to text, and transmits the text of the question to the interaction server 115 via the network 120. The interaction server 115 determines an output based on the question (e.g., typically an answer to the question) and transmits data defining the output to the interactive computing device 105, which converts the data to an audio signal that is output to the user via a speaker of the interactive computing device 105 (e.g., as a verbal output).

In particular embodiments, the interactive computing device 105 provides an unprompted verbal output to a user. Examples of unprompted verbal outputs include: alerting the user of an incoming telephone call, email or text message; alerting the user of a person ringing the doorbell; alerting the user of sensor triggered in a personal security system (e.g., a door sensor, a window sensor, a motion sensor, etc.); alerting the user of sensor triggered in an environmental security system (e.g., a smoke detector, a carbon monoxide detector, a water leak detector, etc.); alerting the user of the expiration of a timer; alerting the user of smoke detected inside an oven (e.g., indicating that something is burning); alerting a user to perform a user-defined task at a user-defined time; reminding a user to leave at a user-defined time for a user-defined appointment; alerting a user of an interpreted or derived task (e.g., email indicates that your library books are due today). These examples are not intended to be limiting, and other types of unprompted verbal output may be utilized in implementations. In embodiments, the unprompted verbal output is generated and output by the interactive computing device 105, or is generated by the interaction server 115 and output to the user by the interactive computing device 105.

With continued reference to FIG. 2A, the IoT devices 110a-n are network connected devices that are configured to obtain data that is used to determine a context associated with a user (e.g., a human). In embodiments, the IoT devices 110a-n comprise one or more of: at least one microphone that obtains environmental audio data including ambient noise and/or verbal outputs by the user and/or other users; at least one video camera that obtains video data of at least one of body position, physical gestures, and facial expression of the user and/or other users; at least one biometric sensor that obtains biometric data of the user including at least one of heart rate, body temperature, electrodermal activity, blood pressure, and respiration rate; at least one spatial sensor that obtains spatial data of the user including at least one of an global positioning system (GPS) sensor, an accelerometer, a gyroscope, and a compass; and at least one of a motion sensor and a proximity sensor that detects the presence of a person in a predefined area. As described in detail herein, the system uses data from these types of sensors in determining a context associated with a user, and the system uses the determined context as part of the process for determining a modified verbal output of the interactive computing device 105 to present to the user.

Still referring to FIG. 2A, the interaction server 115 comprises one or more server computer devices comprising one or more elements of computer system 12 of FIG. 1. In embodiments, the interaction server 115 comprises an output module 125 that is configured to perform one or more of the functions described herein, including: create a corpus of data based on plural verbal interactions involving a user; analyze the corpus of data to determine output parameters that increase an attentiveness of the user in different contexts; determine a verbal output of an interactive computing device to the user; determine a current context; modify the verbal output based on the determined output parameters and the current context; and cause the interactive computing device 105 to output the modified verbal output to the user. In embodiments, the output module 125 comprises one or more program modules 42 as described with respect to FIG. 1. The interaction server 115 also comprises or communicates with a data repository 130, which may comprise a storage system 34 as described with respect to FIG. 1 or some other data storage system.

In accordance with aspects of the invention, the interaction server 115 is configured to modify a verbal output to a user based on determined output parameters and a current context, and to transmit the modified verbal output to the interactive computing device 105, which then outputs the modified verbal output to the user. In particular embodiments, the output module 125 is configured to: identify environmental conditions that may impact a person's response; identify user responses to verbal interactions; and modify standard verbal outputs based on cognitive analysis.

In embodiments, the output module 125 identifies environmental conditions that may include outside activities or moods that may interfere with a person's ability to focus or other noises that may impact a person's ability to hear the verbal output of the interactive computing device 105. In particular embodiments, the output module 125 communicates with the IoT devices 110a-n to obtain sound data, biometric data, and image data in the environment of a user. The output module 125 uses this data to determine at least one of: noise level around the user; biometric state of the user; activities the user is engaged in; and devices the user is engaged with.

In embodiments, the output module 125 identifies the user responses to verbal interactions by tracking how a person responds to human and computing verbal interaction that can be influenced by the environmental conditions, and what modifications to the response have elicited more favorable response. In particular embodiments, the output module 125 is configured to: obtain audio data from the interactive computing device 105 and/or IoT devices 110a-n; and track a user's response to questions (posed by the interactive computing device 105 and/or other users) to determine verbal output parameters associated with when this particular user does and does not respond. The parameters may include at least one of: name used to address the user in the verbal output; volume of the verbal output; cadence of the verbal output; specific words used in the verbal output; categories of words used in the verbal output; pronunciation (e.g., intonation, stress, rhythm, and/or accent) used in the verbal output; and language (e.g., English, Spanish, French, German, etc.) used in the verbal output.

In embodiments, the output module 125 modifies a standard verbal output based on cognitive analysis by utilizing the current environmental conditions and comparing those to an individual's historic responses in those conditions to modify the actions by the interactive computing device 105 to produce a more favorable response. In particular embodiments, the output module 125 is configured to: compare current environment information and individuals needing to respond and look up historical information for such conditions; when the corpus recommends change from the standard verbal output, modify one or more parameters of the verbal output; and observe the user response to the modified verbal input and feed this data back into the system for future analysis.

Figure 2B:
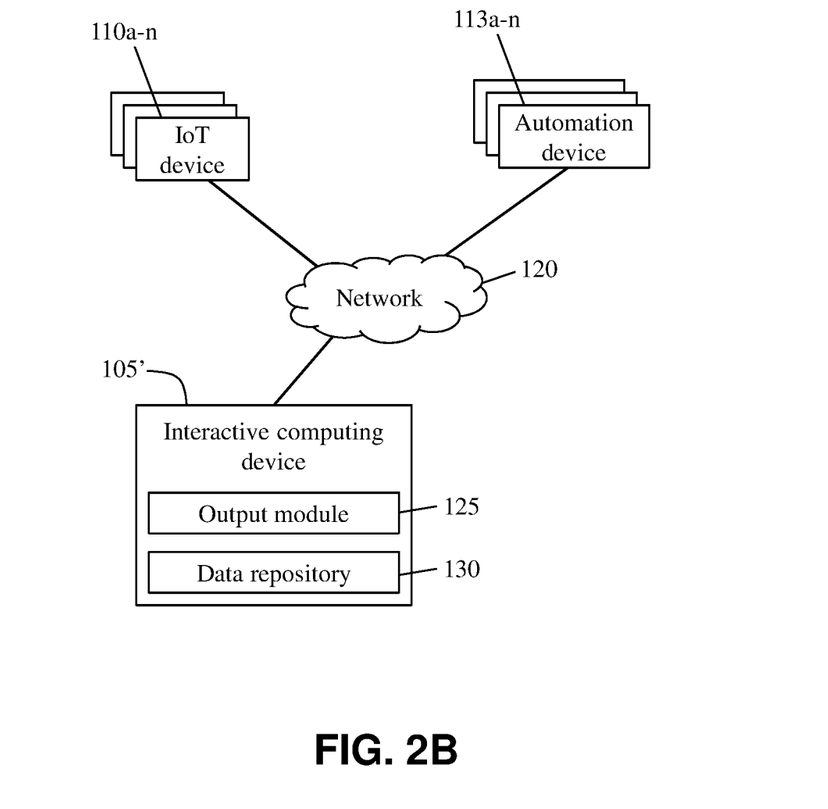
FIG. 2B shows a block diagram of another exemplary environment in accordance with aspects of the invention.

FIG. 2B shows a block diagram of another exemplary environment in accordance with aspects of the invention. The environment includes the IoT devices 110a-n, the automation devices 113a-n, and the network 120 as described with respect to FIG. 2A. In the embodiment shown in FIG. 2B, the environment includes an interactive computing device 105' that includes the output module 125 and the data repository 130. In this manner, the interactive computing device 105' does not communicate with a remote server (e.g., interaction server 115), and instead performs the functions of the output module 125 locally.

In both environments (e.g., FIGS. 2A and 2B), the interactive computing device 105/105' may comprise a static device such as a smart speaker, for example. Alternatively, in both environments (e.g., FIGS. 2A and 2B), the interactive computing device 105/105' may comprise a robotic device that additionally performs physical tasks for the user (e.g., such as a kitchen assistant robot, a home security robot, etc.).

In both environments, the interactive computing device 105/105' (referred to hereinafter simply as the interactive computing device 105) and the IoT devices 110a-n obtain data associated with historic interactions between the user and another user and between the user and the interactive computing device 105. The output module 125 obtains this data from the interactive computing device 105 and/or the IoT devices 110a-n, and stores this data as part of the corpus of data for a particular user in the data repository 130. The output module 125 analyzes the historic data for a particular user, e.g., using machine learning or other analysis techniques, to determine which parameters are most effective at getting this user's attention in different contexts. Then, when a current situation warrants a verbal output from the interactive computing device 105, the output module 125 determines a current context from data from the interactive computing device 105 and/or the IoT devices 110a-n. The output module 125 then determines parameters for modifying the verbal output that is to be provided to the user. In embodiments, the output module 125 compares the current context to the historic contexts associated with historic interactions in the data repository, and for historic interactions having the same context as the current context, determines which parameters are most effective in getting the user's attention. The output module 125 then modifies the current verbal output using the determined parameters, e.g., by applying the parameters to the current verbal output.

With regard to determining context, in accordance with aspects of the invention, the output module 125 analyzes data from at least one of the interactive computing device 105, one or more of the IoT devices 110a-n, and/or one or more of the automation devices 113a-n to determine a context of a user involved in a verbal interaction with another user or with the interactive computing device 105. The context can comprise at least one of: an amount of environmental noise; at least one activity the user is engaged in; and a biometric state of the user.

In some implementations, the context comprises an amount of environmental noise that includes, for example, a volume level of noise (e.g., measured in dB) in a same area as the user, e.g., as detected by one or more microphones of the IoT devices 110a-n in the vicinity of the user.

In some implementations, the context comprises an activity the user is engaged in, such as: watching television; listening to music; listening to a podcast; having a discussion with another person; cooking; exercising; reading; working at a computer; playing video games; and sleeping. These examples are not limiting, and the context may comprise other activities. In embodiments, the system determines the activity by analyzing data from one at least one of the IoT devices 110a-n and/or at least one of the automation devices 113a-n.

For example, the system might determine that the context comprises the user is watching television based on a combination of: data from the television (e.g., an automation device 113a-n) used to determine the television is on; data from a motion sensor and/or a proximity sensor (e.g., an IoT device 110a-n) used to determine a person is in the same room as the television that is on; and data from a video camera (e.g., an IoT device 110a-n) used to identify the user from the face of the person that is in the same room as the television.

In another example, the system might determine that the context comprises the user is cooking while listening to music and talking to another person based on a combination of: data from a music player (e.g., an automation device 113a-n) used to determine that music is playing; data from a stove (e.g., an automation device 113a-n) used to determine that the a burner of the stove is on; data from a refrigerator (e.g., an automation device 113a-n) used to determine that the user is opening and closing the refrigerator door; data from a microphone (e.g., an IoT device 110a-n) used to determine a volume level of the music; and data from a microphone (e.g., an IoT device 110a-n) used to determine that the user is engaged in a conversation with another person.

In some implementations, the context comprises a biometric state of user, such as: tired; alert; and relaxed. For example, the system may be programmed to determine the biometric state of the user based on analyzing data from at least one of: one or more biometric sensors (e.g., to determine one or more of heart rate, blood pressure, and respiration rate); and a camera (e.g., to determine facial expression). These examples are not limiting, and the context may comprise other biometric states.

In embodiments, the determined context may include a single context or plural contexts. An example of a single context is: the user is currently watching television (e.g., an activity). An example of plural contexts is: the user is currently watching television (e.g., an activity); the volume level of the environment is 70 dB (e.g., environmental noise); and the user is relaxed (e.g., biometric state).

With regard to determining parameters that are effective in getting the user's attention, in accordance with aspects of the invention, the output module 125 analyzes data from at least one of the interactive computing device 105 and one or more IoT devices 110a-n to determine a measure of how much or how little a user responds to a verbal output from another user or from the interactive computing device 105.

In some embodiments, the output module 125 analyzes data obtained from one or more microphones (e.g., IoT devices 110a-n) to determine that a target user of a verbal output reacted to the verbal output in one of the following ways: the user acknowledged the verbal output; the user asked for clarification of the verbal output; the user provided a response that is not related to the verbal output; and the user did not respond to the verbal output. These examples are not limiting, and other types of reactions captured via audio data can be analyzed by the system to measure a degree of how much or how little the user reacted to the verbal output. In embodiments, each such detected action may be assigned a predefined score (e.g., measure) defining a degree of how much or how little the user reacted to the verbal output.

In some embodiments, the output module 125 analyzes data obtained from one or more cameras (e.g., IoT devices 110a-n) to determine that a target user of a verbal output reacted to the verbal output in one of the following ways: the user turned to face the speaker of the verbal output; the user did not turn the face the speaker of the verbal output; the user's facial expression changed immediately after the verbal output; the user's facial expression did not change immediately after the verbal output; the user stopped performing an activity immediately after the verbal output; the user did not stop performing an activity immediately after the verbal output. These examples are not limiting, and other types of reactions captured via video data can be analyzed by the system to measure a degree of how much or how little the user reacted to the verbal output. The system may be programmed with image analysis techniques, such as computer vision techniques, to perform this step of analyzing video data to detect a predefined type of response by a person in the video. In embodiments, each such detected action may be assigned a predefined score (e.g., measure) defining a degree of how much or how little the user reacted to the verbal output.

In some embodiments, the output module 125 analyzes data obtained from one or more one or more automation devices 113a-n to determine that a target user of a verbal output reacted to the verbal output in one of the following ways: the user stopped their current activity in response to the verbal output (e.g., the user turned off the television immediately after the verbal output, etc.); the user did not stop their current activity in response to the verbal output (e.g., the user did not turn off the television immediately after the verbal output, etc.). These examples are not limiting, and other types of reactions captured via device data can be analyzed by the system to measure a degree of how much or how little the user reacted to the verbal output. In embodiments, each such detected action may be assigned a predefined score (e.g., measure) defining a degree of how much or how little the user reacted to the verbal output.

Still regarding determining parameters that are effective in getting the user's attention, in addition to scoring the user's response to a verbal output, the system analyzes the verbal output to determine parameters that are present in the verbal output. In embodiments, the output module 125 analyzes the text of the verbal output and the audio of the verbal output to determine at least one of: name(s) used to address the user in the verbal output; volume (e.g., dB level) of the verbal output; cadence (e.g., speed) of the verbal output; specific words used in the verbal output; categories of words used in the verbal output; pronunciation (e.g., intonation, stress, rhythm, and/or accent) used in the verbal output; and language (e.g., English, Spanish, French, German, etc.) used in the verbal output. For example, the output module 125 may determine these presence of these parameters in a verbal output by analyzing the verbal output using at least one of: natural language processing (NLP) techniques (such as natural language understanding (NLU) and/or natural language classification (NLC)); and tone analysis.

In embodiments, for each respective one of plural historic interactions between the user and another user or the interactive computing device 105, the output module 125 determines a context, a measure of effectiveness, and at least one parameter of the verbal output. As described above, the context may include one context or plural contexts. As also described above, the measure of effectiveness may be a single measure or a combination of measures from plural detected reactions by the user. As also described above, the at least one parameter of the verbal output may comprise a single parameter of plural different parameters. The output module 125 stores this data for each respective one of the historic interactions involving the user in a corpus of data for this user in the data repository 130. In embodiments, the system observes interactions of plural different users and creates a respective corpus of data as described herein for each respective user.

According to aspects of the invention, the system analyzes the corpus of data for a particular user to determine which parameters have a high measure of getting the attention of the particular user in a given context. As described above, the corpus of data for the user includes plural entries, wherein each entry includes: a context associated with a verbal output; a measure of effectiveness of the verbal output; and at least one parameter of the verbal output. In embodiments, the output module 125 analyzes the plural entries in the corpus of data of a single user to determine what one or more parameters result in the highest measure of effectiveness for a respective context or group of contexts. In particular embodiments, the output module 125 uses machine learning techniques to analyze the corpus of data to make this determination as to which parameters are the most effective for this user for a particular context.

The following use cases are described to illustrate functionality of the system and method as described herein. These use cases are exemplary and are not intended to limit the scope of implementations of the invention.

In a first exemplary use case, the system observes plural interactions between Pam (a parent) and Claire (a child of the parent, Pam). Based on collecting data from the plural interactions between Pam and Claire and analyzing this data, the system determines that when Claire is engaged in the activity of watching television (e.g., a determined context), the most effective parameter for getting Claire's attention is to increase the volume level of a verbal output by 20% above the normal volume level of a verbal output (e.g., modify the verbal output using a determined parameter). At a later time, the system is scheduled to provide a verbal output to Claire, the verbal output being a reminder to start doing homework at 8:00 PM. At the time of the reminder, the system determines that Claire is currently watching television. As a result, the system modifies the verbal output to Claire to increase the volume of the verbal output by 20% above the normal volume.

In a second exemplary use case, the system observes plural interactions between Paul (a parent) and Charles (a child of the parent, Paul). Based on collecting data from the plural interactions between Paul and Charles and analyzing this data, the system determines that when Charles is reading, the most effective manner of getting Charles's attention is to slow the cadence of a verbal output by 10% and to repeat Charles's name until he responds. At a later time, the system is scheduled to provide a verbal output to Charles, the verbal output being a reminder to brush his teeth at 8:00 PM. At the time of the reminder, the system determines that Charles is currently reading. As a result, the system modifies the verbal output to Charles to decrease the cadence of the verbal output and to repeat Charles's name three times at the beginning of the verbal output.

In a third exemplary use case, the system observes plural interactions between Frank and the interactive computing device, and also plural interactions between Frank and other people. Based on collecting data from the plural interactions involving Frank and analyzing this data, the system determines that when Frank is listening to music, Frank only responds a subset of verbal outputs from the interactive computing device, that Frank frequently asks other people to repeat themselves, and that Frank's responses to other people and the interactive computing device are not related to the original interaction. Based on this analysis, the system determines that when Frank is listening to music, the most effective manner of getting Frank's attention is to decrease the volume of the music and to decrease the cadence of the verbal output to Frank. The system utilizes these modifications to the next verbal output to Frank when Frank is listening to music.

In a fourth exemplary use case, the system observes plural interactions between Kevin and other people. Based on collecting data from the plural interactions between Kevin and other people and analyzing this data, the system determines that when Kevin is on a telephone call with another person (e.g., a determined context) and is tired (e.g., a determined biometric state), the most effective manner of getting Kevin's attention is to say his first name and then his and last name fast and loud (e.g., at an elevated cadence and elevated volume), wait for two seconds, and then output the remainder of the verbal output at a normal cadence and volume. At a later time, the system resolves to inform Kevin via verbal output that a water leak sensor (e.g., an automation device 113a-n) is detecting water. At the time of the verbal output, the system determines that Kevin is currently on a telephone call with another person and is tired. As a result, the system modifies the verbal output to Kevin to say his first name and then his last name fast and loud (e.g., at an elevated cadence and elevated volume), wait for two seconds, and then output the remainder of the verbal output at a normal cadence and volume.

Continuing the fourth exemplary use case, based on collecting data from the plural interactions between Kevin and other people and analyzing this data, the system determines that when Kevin is cooking dinner and listening to music, the most effective manner of getting Kevin's attention is to start by saying "Hey Kevin" with a stress on the word "Hey," and then proceed with the rest of the verbal output. At a later time, the system resolves to inform Kevin via verbal output that the water leak sensor (e.g., an automation device 113a-n) is detecting water. At the time of the verbal output, the system determines that Kevin is currently cooking dinner and listening to music. As a result, the system modifies the verbal output to Kevin to say "Hey Kevin" with a stress on the word "Hey," and then proceed with the rest of the verbal output.

In a fifth exemplary use case, the system observes plural interactions between Teresa and other people. Based on collecting data from the plural interactions between Teresa and other people and analyzing this data, the system determines that Teresa's native language is French that Teresa speaks some English but not at the same vocabulary level as she does French, and that Teresa only speaks English when speaking with Tanya. At a later time, the system resolves to provide an alert to Teresa that a package has been delivered to the front door. Teresa has her interactive computing device 105 configured to use French as the default language for verbal outputs. At the time of the verbal output regarding the delivery, however, the system detects that Teresa is speaking English with Tanya, and therefore modifies the verbal output to be spoken in English instead of French.

As is understood from these use cases, the system is configured to provide different modifications for different users based on each user's past interactions. Additionally, as is understood from the fourth use case, the system is configured to personalize (e.g., modify) different verbal outputs differently for a same user (e.g., Kevin in this case) based on different contexts and/or biometric states.

Figure 3:
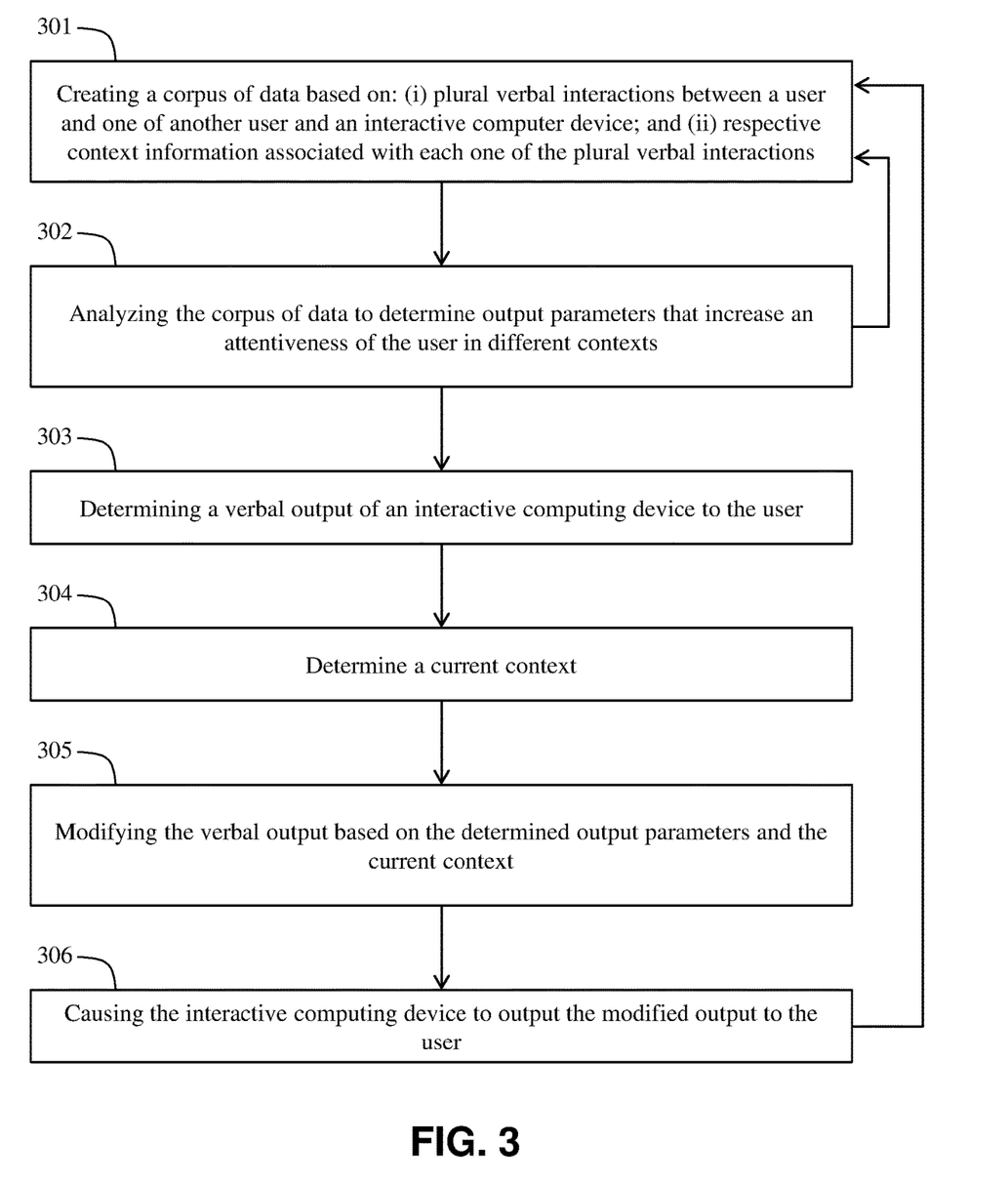
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2A or FIG. 2B and are described with reference to elements depicted in FIGS. 2A and 2B.

At step 301, the system creates a corpus of data for a user. In embodiments, the output module 125 creates the corpus of data based on: (i) plural verbal interactions between a user and one of another user and an interactive computing device; and (ii) respective context information associated with each one of the plural verbal interactions. In particular embodiments, and as described with respect to FIGS. 2A and 2B, the corpus of data for the user includes plural entries, wherein each entry includes: a context associated with a verbal output; a measure of effectiveness of the verbal output; and at least one parameter of the verbal output. The context, measure of effectiveness, and at least one parameter are determined in the manner described with respect to FIGS. 2A and 2B. Step 305 may include the step of collecting the data associated with each one of the plural verbal interactions, where the data is collected from at least one of: the interactive computing device 105, at least one IoT device 110a-n, and at least one automation device 113a-n. In embodiments, the corpus of data for a particular user is stored in the data repository 130, which may store data defining plural different corpora of data for plural different users.

At step 302, the system analyzes the corpus of data to determine output parameters that increase an attentiveness of the user in different contexts. In embodiments, and as described with respect to FIGS. 2A and 2B, the output module 125 analyzes the plural entries in the corpus of data of the user to determine what one or more parameters result in the highest measure of effectiveness for a respective context or group of contexts. In particular embodiments, the output module 125 utilizes machine learning to analyze the corpus of data to make this determination as to which parameters are the most effective for this user for each particular context.

In accordance with aspects of the invention, steps 301 and 302 can occur in an endless loop as the system observes subsequent verbal interactions involving this user and other people. In embodiments, the system collecting data from such subsequent interactions between the user and other people, adds this data to the corpus of data at step 301, and analyzes the updated corpus of data at step 302. In this manner the system continuously updates the corpus of data and refines the determination of the output parameters that increase the attentiveness of the user in different contexts.

At step 303, the system determines a verbal output to present to the user. In embodiments, and as described with respect to FIGS. 2A and 2B, the output module 125 determines a verbal output in a standard manner. Examples of verbal outputs include but are not limited to: alerting the user of an incoming telephone call, email, or text message; alerting the user of a person ringing the doorbell; alerting the user of sensor triggered in a personal security system (e.g., a door sensor, a window sensor, a motion sensor, etc.); alerting the user of sensor triggered in an environmental security system (e.g., a smoke detector, a carbon monoxide detector, a water leak detector, etc.); alerting the user of the expiration of a timer; alerting the user of smoke detected inside an oven (e.g., indicating that something is burning); alerting a user to perform a user-defined task at a user-defined time; reminding a user to leave at a user-defined time for a user-defined appointment; alerting a user of an interpreted or derived task (e.g., email indicates that your library books are due today). These examples are not limiting, and other verbal outputs may be used in implementations.

At step 304, the system determines a current context. In embodiments, and as described with respect to FIGS. 2A and 2B, the output module 125 determines a context of the user at the time that the system resolves to present the verbal output (from step 303) to the user. In particular embodiments, the context comprises at least one of: an amount of environmental noise; at least one activity the user is engaged in; and a biometric state of the user. As described herein, the output module 125 determines the context by analyzing data from at least one of: the interactive computing device 105; at least one IoT device 110a-n; and at least one automation device 113a-n.

At step 305, the system modifies the verbal output (from step 303) based on the determined output parameters (from step 302) and the current context (from step 304). As described herein, an output of step 302 is a determination of parameters that are the most effective for this user for each particular context. Accordingly, at step 305 the output module 125 analyzes the output of step 302 for a context that matches the current context (from step 304). Based on finding a matching context, the output module 125 uses the parameters associated with the matching context (i.e., the parameters determined for this context at step 302) to modify the verbal output that is initially determined at step 304. For example, at step 305, the output module 125 may modify verbal output that is initially determined at step 304 by changing at least one of: the name(s) used to address the user in the verbal output; volume of the verbal output; cadence of the verbal output; specific words used in the verbal output; categories of words used in the verbal output; pronunciation used in the verbal output; and language used in the verbal output.

At step 306, the system causes the interactive computing device to output the modified verbal output (from step 305) to the user. In the environment of FIG. 2A, step 306 comprises the server 115 sending data defining the modified verbal output to the interactive computing device 105, which then outputs the modified verbal output via one or more speakers. In the environment of FIG. 2A, where the output module 125 resides at the interactive computing device 105, step 306 comprises the interactive computing device 105 outputting the modified verbal output via one or more speakers.

According to aspects of the invention, the system observes the response of the user to the modified verbal output that is presented at step 306, and feeds this data back to the output module to be added to the corpus of data for this user. In this manner, the system continues to learn from each modified verbal output that is presented. For example, if the user fails to respond to the modified verbal output at step 306, then by including this data in the next iterations of step 301 and step 302, the system will be less likely to use these modifications for this user for this same context for future verbal outputs. Conversely, if the user responds to the modified verbal output at step 306, then by including this data in the next iterations of step 301 and step 302, the system will be more likely to use these modifications for this user for this same context for future verbal outputs.

As described herein, some implementations of the invention provide a computer enabled system and method to modify verbal communications from a computing device to a human, the method comprising: using IoT fed data, identifying current environmental conditions that impact a person's response; tracking responses from an individual to different volume, language, cadence and work selection after interaction with another person or computer; and matching the current environment to historical responses to identify changes in the communications with the individual. In some embodiments, the method comprises at least one of: identifying extraneous noise; monitoring biometric state; identifying other activities a person is engaged in; and classifying the skill level required to understand a specific phrase. In some embodiments, the method comprises monitoring interactions to determine whether a user asks for clarification on the interaction, answers a non-related question, or provides no response at all. In some embodiments, the method comprises comparing a corpus of information about a person to a selection of current environmental variables to see positive changes that resulted from changing the response from the norm.

As described herein, some implementations of the invention provide a computer-implemented method comprising: determining contextual information of an interactive conversation between a user and a computing device; and modifying the interactive conversation based on a cognitive analysis of historical responses and the determined contextual information. In some embodiments, the determined contextual information comprises extraneous noise, biometric state of the user, activities currently being performed by the user, vocabulary level of the user. In some embodiments, the determining contextual information of an interactive conversation between a user and a computing device comprises: registering one or more Internet of Things (IoT) devices; in response to detecting audio, video, and image information from the one or more IoT devices, determining vocabulary level, noise, biometric state, and activities associated with the detected audio, video, and image information. In some embodiments, the method comprises determining a language spoken by the user and vocabulary level of the user in response to detecting one or more user responses. In some embodiments, the modifying the interactive conversation based on a cognitive analysis of historical responses and the determined contextual information comprises: comparing contextual information with historical information associated with the user; identifying when interaction between the user and the computing device should be modified; and in response to identifying that the interaction between the user and the computing device should be modified, modifying at least one of: words used by the computing device, volume of the computing device, and language used by the computing device. In some embodiments, the method comprises storing the modified action in a database for future analysis.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   creating, by a server, a corpus of data based on plural verbal interactions involving a user;
   analyzing, by the server, the corpus of data to determine output parameters that increase an attentiveness of the user in different contexts;
   determining, by the server, a verbal output of an interactive computing device to the user;
   determining, by the server, a current context;
   modifying, by the server, the verbal output based on the determined output parameters and the current context; and
   causing, by the server, the interactive computing device to output the modified verbal output to the user.

2. The method of claim 1, wherein the plural verbal interactions comprise verbal interactions between the user and the interactive computing device.

3. The method of claim 1, wherein the plural verbal interactions comprise verbal interactions between the user and another person.

4. The method of claim 1, wherein the corpus of data includes plural entries, wherein each entry includes: a context associated with a respective verbal output; a measure of effectiveness of the respective verbal output; and at least one parameter of the respective verbal output.

5. The method of claim 4, further comprising determining the context associated with the respective verbal output based on data from at least one selected from the group consisting of:
   a microphone that obtains audio data of an environment around the user;
   a video camera that obtains video data of the environment around the user;
   a biometric sensor that obtains biometric data of the user;
   a spatial sensor that obtains spatial data of the user; and
   a motion sensor or a proximity sensor that detects the presence of a person in a predefined area.

6. The method of claim 4, wherein context associated with the respective verbal output is selected from the group consisting of:
   an activity the user is performing at the time of the verbal interaction;
   a biometric state of the user at the time of the verbal interaction; and
   an amount of environmental noise at the time of the verbal interaction.

7. The method of claim 4, wherein the context associated with the respective verbal output comprises plural determined contexts.

8. The method of claim 4, wherein the measure of effectiveness of the respective verbal output comprises a combination of measures from plural detected reactions by the user.

9. The method of claim 4, wherein the at least one parameter of the respective verbal output comprises plural different parameters.

10. The method of claim 1, wherein the determining the current context comprises obtaining and analyzing data from at least one selected from the group consisting of:
    a microphone that obtains audio data of an environment around the user;
    a video camera that obtains video data of the environment around the user;
    a biometric sensor that obtains biometric data of the user;
    a spatial sensor that obtains spatial data of the user; and
    a motion sensor or a proximity sensor that detects the presence of a person in a predefined area.

11. The method of claim 1, wherein the modifying the verbal output comprises changing at least one selected from the group consisting of:
    name or names used to address the user in the verbal output;
    volume of the verbal output;
    cadence of the verbal output;
    specific words used in the verbal output;

categories of words used in the verbal output;
pronunciation of words used in the verbal output; and
language used in the verbal output.

12. The method of claim 1, further comprising:
observing a response of the user to the modified verbal output; and
updating the corpus of data to include the current context, the modified verbal output, and the response of the user.

13. A method, comprising:
creating, by an interactive computing device, a corpus of data based on plural verbal interactions involving a user;
analyzing, by the interactive computing device, the corpus of data to determine output parameters that increase an attentiveness of the user in different contexts;
determining, by the interactive computing device, a verbal output of the interactive computing device to the user;
determining, by the interactive computing device, a current context;
modifying, by the interactive computing device, the verbal output based on the determined output parameters and the current context; and
outputting, by the interactive computing device, the modified verbal output to the user.

14. The method of claim 13, wherein:
the current context is selected from the group consisting of: an activity the user is performing; a biometric state of the user; and an amount of environmental noise; and
the modifying the verbal output comprises changing at least one selected from the group consisting of: name or names used to address the user in the verbal output; volume of the verbal output; cadence of the verbal output; specific words used in the verbal output; categories of words used in the verbal output; pronunciation of words used in the verbal output; and language used in the verbal output.

15. The method of claim 13, wherein the interactive computing device is a robot that performs at least one physical task.

16. A computer program product, the computer program product comprising a computer readable storage medium having program instructions embodied therewith, the program instructions executable by a computer device to cause the computer device to:
analyze a corpus of data of a user, wherein the analyzing comprises using machine learning to determine parameters that are most effective in getting the user's attention in different contexts;
determine a current context of the user based on the user being a target audience of a verbal output of an interactive computing device;
modify the verbal output based on the current context and the determined parameters; and
cause the interactive computing device to output the modified verbal output to the user.

17. The computer program product of claim 16, wherein:
the current context is selected from the group consisting of: an activity the user is performing; a biometric state of the user; and an amount of environmental noise; and
the modifying the verbal output comprises changing at least one selected from the group consisting of: name or names used to address the user in the verbal output; volume of the verbal output; cadence of the verbal output; specific words used in the verbal output; categories of words used in the verbal output; pronunciation of words used in the verbal output; and language used in the verbal output.

18. A system, comprising:
a processor, a computer readable memory, and a computer readable storage medium;
program instructions to determine a verbal output for an interactive computing device to present to a user;
program instructions to determine a current context of the user;
program instructions to modify the verbal output based on verbal output parameters, wherein the modifying comprises matching the current context to one of plural different contexts of a group of contexts, and the verbal output parameters used in the modifying the verbal output are parameters that are determined to be most effective for getting the attention of the user in the one of the plural different contexts; and
program instructions to cause the interactive computing device to output the modified verbal output to the user,
wherein the program instructions are stored on the computer readable storage medium for execution by the processor via the computer readable memory.

19. The system of claim 18, wherein the current context is selected from the group consisting of:
an activity the user is performing;
a biometric state of the user; and
an amount of environmental noise.

20. The system of claim 18, wherein the modifying the verbal output comprises changing at least one selected from the group consisting of:
name or names used to address the user in the verbal output;
volume of the verbal output;
cadence of the verbal output;
specific words used in the verbal output;
categories of words used in the verbal output;
pronunciation of words used in the verbal output; and
language used in the verbal output.

21. A method, comprising:
determining, by a computer device, a current context associated with a user that is the target audience of an unprompted verbal output of an interactive computing device;
determining, by the computer device, one or more parameters that are most effective in getting the attention of the user for the determined current context; and
modifying, by the computer device, the unprompted verbal output of the interactive computing device using the determined one or more parameters.

22. The method of claim 21, wherein the computer device comprises a server that communicates with the interactive computing device via a network, and further comprising the server transmitting data defining the modified unprompted verbal output to the interactive computing device for output to the user by the interactive computing device.

23. The method of claim 21, wherein the interactive computing device is a robot that performs at least one physical task.

24. The method of claim 21, wherein the context comprises at least one selected from the group consisting of: an amount of environmental noise; at least one activity the user is engaged in; and a biometric state of the user.

25. The method of claim 21, wherein the parameter comprises at least one selected from the group consisting of: name or names used to address the user in the unprompted verbal output; volume of the unprompted verbal output; cadence of the unprompted verbal output; specific words used in the unprompted verbal output; categories of words used in the unprompted verbal output; pronunciation of words used in the unprompted verbal output; and language used in the unprompted verbal output.

* * * * *